(12) United States Patent
Teyssandier et al.

(10) Patent No.: US 9,618,641 B2
(45) Date of Patent: Apr. 11, 2017

(54) METHOD AND DEVICE FOR DETERMINING A DRIVING SIGNAL FOR VIBROSEIS MARINE SOURCES

(71) Applicant: CGGVERITAS SERVICES SA, Massy (FR)

(72) Inventors: Benoit Teyssandier, Massy (FR); Laurent Ruet, Massy (FR)

(73) Assignee: CGG SERVICES SAS, Massy (FR)

( * ) Notice: Subject to any disclaimer, the term of this patent is extended or adjusted under 35 U.S.C. 154(b) by 668 days.

(21) Appl. No.: 13/687,084

(22) Filed: Nov. 28, 2012

(65) Prior Publication Data

US 2014/0104986 A1    Apr. 17, 2014

Related U.S. Application Data

(63) Continuation of application No. 13/415,259, filed on Mar. 8, 2012.

(30) Foreign Application Priority Data

Oct. 19, 2011    (FR) ...................................... 11 59436

(51) Int. Cl.
   *G01V 1/38*    (2006.01)
   *G01V 1/00*    (2006.01)

(52) U.S. Cl.
   CPC ................ *G01V 1/38* (2013.01); *G01V 1/005* (2013.01); *G01V 2210/1293* (2013.01)

(58) Field of Classification Search
   USPC ........... 181/110; 310/14, 35; 367/20, 38, 46, 367/174; 477/3, 418; 701/54
   See application file for complete search history.

(56) References Cited

U.S. PATENT DOCUMENTS

| | | | |
|---|---|---|---|
| 3,288,243 A | 11/1966 | Silverman | |
| 3,331,050 A | 7/1967 | Kilmer et al. | |
| 3,691,516 A | 9/1972 | Graham et al. | |

(Continued)

FOREIGN PATENT DOCUMENTS

| | | |
|---|---|---|
| EP | 2 267 486 A2 | 12/2010 |
| GB | 2 183 834 A | 6/1987 |

(Continued)

OTHER PUBLICATIONS

Del Grosso, "New equation for the speed of sound in natural waters (with comparisons to other equations)," J. Acoust:. Soc. Am., vol. 56, No. 4. Oct. 1974.*

(Continued)

*Primary Examiner* — Daniel L Murphy
(74) *Attorney, Agent, or Firm* — Patent Portfolio Builders PLLC

(57) ABSTRACT

Controller and method for determining a driving signal of a vibro-acoustic source element that is configured to generate acoustic waves in water. The method includes estimating at least one physical constraint of the vibro-acoustic source element; modeling a ghost function determined by a surface of the water; setting a target energy spectrum density to be emitted by the vibro-acoustic source element during the driving signal; and determining the driving signal in a controller based on at least one physical constraint, the ghost function, and the target energy spectrum density.

17 Claims, 13 Drawing Sheets

(56) References Cited

U.S. PATENT DOCUMENTS

| | | | |
|---|---|---|---|
| 3,885,225 A | 5/1975 | Anstey et al. | |
| 4,030,063 A | 6/1977 | Wallen | |
| 4,069,470 A | 1/1978 | Cunningham et al. | |
| 4,159,463 A | 6/1979 | Silverman | |
| 4,168,485 A | 9/1979 | Payton et al. | |
| 4,188,610 A | 2/1980 | Nelson | |
| 4,272,226 A * | 6/1981 | Osborne | 417/418 |
| 4,295,213 A | 10/1981 | Mifsud | |
| 4,353,120 A | 10/1982 | Pickens | |
| 4,391,299 A | 7/1983 | Holmes | |
| 4,441,174 A | 4/1984 | Ray et al. | |
| 4,514,834 A | 4/1985 | Hanson et al. | |
| 4,556,963 A | 12/1985 | Hugus et al. | |
| 4,636,956 A | 1/1987 | Vannier et al. | |
| 4,715,020 A | 12/1987 | Landrum, Jr. | |
| 4,799,201 A | 1/1989 | Nelson | |
| 4,823,326 A | 4/1989 | Ward | |
| 4,885,726 A | 12/1989 | Myers | |
| 4,953,657 A | 9/1990 | Edington | |
| 4,969,129 A | 11/1990 | Currie | |
| 4,982,374 A | 1/1991 | Edington et al. | |
| 5,062,089 A | 10/1991 | Willard et al. | |
| 5,128,900 A | 7/1992 | Cole | |
| 5,142,498 A | 8/1992 | Duren | |
| 5,199,005 A | 3/1993 | Forsberg | |
| 5,281,773 A | 1/1994 | Duren | |
| 5,410,517 A | 4/1995 | Andersen | |
| 5,426,618 A | 6/1995 | Chen et al. | |
| 5,703,833 A | 12/1997 | Allen | |
| 5,719,821 A | 2/1998 | Sallas et al. | |
| 5,721,710 A | 2/1998 | Sallas et al. | |
| 5,901,112 A | 5/1999 | Walker | |
| 5,959,939 A | 9/1999 | Tengham et al. | |
| 6,028,818 A | 2/2000 | Jeffryes | |
| 6,049,507 A | 4/2000 | Allen | |
| 6,076,629 A | 6/2000 | Tengham | |
| 6,076,630 A | 6/2000 | Ambs | |
| 6,161,076 A | 12/2000 | Barr et al. | |
| 6,181,646 B1 | 1/2001 | Bouroucos et al. | |
| 6,253,156 B1 | 6/2001 | Bui-Tran et al. | |
| 6,327,537 B1 | 12/2001 | Ikelle | |
| 6,366,857 B1 | 4/2002 | Bird et al. | |
| 6,370,477 B1 | 4/2002 | Vermeer | |
| 6,464,035 B1 | 10/2002 | Chelminski | |
| 6,545,944 B2 | 4/2003 | de Kok | |
| 6,597,632 B2 | 7/2003 | Khan | |
| 6,606,958 B1 | 8/2003 | Bouyoucos | |
| 6,664,788 B2 | 12/2003 | Hornbostel et al. | |
| 6,687,619 B2 | 2/2004 | Moerig et al. | |
| 6,704,245 B2 | 3/2004 | Becquey | |
| 6,714,867 B2 | 3/2004 | Meunier | |
| 6,754,590 B1 | 6/2004 | Moldoveanu | |
| 6,766,256 B2 | 7/2004 | Jeffryes | |
| 6,807,508 B2 | 10/2004 | Becquey | |
| 6,842,701 B2 | 1/2005 | Moerig et al. | |
| 6,942,059 B2 | 9/2005 | Smith | |
| 7,257,049 B1 | 8/2007 | Laws et al. | |
| 7,327,633 B2 | 2/2008 | Bagaini et al. | |
| 7,386,397 B2 | 6/2008 | Amundsen et al. | |
| 7,515,505 B2 | 4/2009 | Krohn et al. | |
| 7,551,518 B1 | 6/2009 | Tenghamn | |
| 7,774,142 B2 | 8/2010 | Amundsen et al. | |
| 7,859,945 B2 | 12/2010 | Sallas et al. | |
| 7,881,160 B2 | 2/2011 | Rouquette | |
| 7,974,152 B2 | 7/2011 | Tenghamn | |
| 8,271,173 B2 * | 9/2012 | Wilmanowicz et al. | 701/70 |
| 8,339,896 B2 | 12/2012 | van Borselen et al. | |
| 8,522,915 B2 | 9/2013 | Hopperstad et al. | |
| 2003/0176974 A1 | 9/2003 | Baliguet et al. | |
| 2004/0089499 A1 | 5/2004 | Smith | |
| 2006/0018192 A1 | 1/2006 | Jeffryes et al. | |
| 2006/0074562 A1 | 4/2006 | Amundsen et al. | |
| 2007/0133354 A1 | 6/2007 | Bagaini et al. | |
| 2009/0238038 A1 | 9/2009 | Bagaini et al. | |
| 2009/0251994 A1 | 10/2009 | Rouquette | |
| 2010/0118647 A1 | 5/2010 | Tenghamn | |
| 2010/0232260 A1 | 9/2010 | Zowarka et al. | |
| 2011/0038225 A1 | 2/2011 | Tenghamn | |
| 2011/0085416 A1 | 4/2011 | Sallas | |
| 2011/0085422 A1 | 4/2011 | Thompson et al. | |
| 2011/0120724 A1 | 5/2011 | Krohn | |
| 2011/0128818 A1 | 6/2011 | Eick et al. | |
| 2011/0162906 A1 | 7/2011 | Harper et al. | |
| 2011/0205842 A1 | 8/2011 | Baeten | |
| 2011/0317515 A1 * | 12/2011 | Tenghamn | 367/20 |
| 2012/0188845 A1 * | 7/2012 | Jeffryes | 367/46 |
| 2012/0314536 A1 | 12/2012 | Bagaini | |
| 2014/0238773 A1 | 8/2014 | Sallas et al. | |

FOREIGN PATENT DOCUMENTS

| | | |
|---|---|---|
| GB | 2259141 A | 3/1993 |
| GB | 2 280 032 A | 1/1995 |
| GB | 2 306 219 A | 4/1997 |
| WO | 86/03015 | 5/1986 |
| WO | 01/16621 A1 | 3/2001 |
| WO | 2009/077762 A2 | 6/2009 |
| WO | 2012/123883 A2 | 9/2012 |
| WO | 2012170608 A2 | 12/2012 |

OTHER PUBLICATIONS

"Determine," thesaurus.com, downloaded Jun. 20, 2014 from http://www.thesaurus.com/browse/determine.*

William H. Dragoset, "Marine Vibrators and the Doppler Effect". Geophysics, vol. 53., No. 11, Nov. 1989, pp. 1388-1398.

Gary Hampson et al., "Effects of Source and Receiver Motion on Seismic Data", Geophysical Prospecting vol. 43, Issue 2, Feb. 1995, pp. 221-244.

J.E. Martin et al., Abstract of "Simultaneous Vibroseis Recording", Geophysical Prospecting, vol. 41, Apr. 1993.

Choon Byong Park et al., "Swept Impact Seismic Technique (SIST)", Geophysics, vol. 61, No. 6, Nov.-Dec. 1996, pp. 1789-1803.

William C. Pritchett, "An Example of Simultaneous Recording Where Necessary Signal Separation is Easily Achieved", Geophysics, vol. 56, No. 1, Jan. 1991 pp. 9-17.

E. Rietsch, "Vibroseis Signals With Prescribed Power Spectrum", Geophysical Prospecting, vol. 25, Issue 4, Dec. 1977, pp. 614-620.

Abd El-Aziz Khairy Abd El-Aal, "Harmonic by Harmonic Removal Technique for Improving Vibroseis Data Quality", Geophysical Prospecting, vol. 59, Issue 2, Mar. 2011, pp. 279-294.

E. Rietsch, "Computerized Analysis of Vibroseis Signal Similarity", Geophysical Prospecting, vol. 25, Issue 3, Sep. 1977, pp. 541-552.

Ulrich Polom, "Elimination of source-genrated noise from correlated vibroseis data (the 'ghost-seep' problem)", Geophysical Prospecting, vol. 45, Issue 4, Jul. 1997, pp. 571-591.

Written Opinion of the International Searching Authority in corresponding International Application No. PCT/EP2012/067998 mailed Oct. 17, 2012.

International Search Report in corresponding International Application No. PCT/EP2012/067998 mailed Oct. 17, 2012.

Great Britain Search Report in corresponding Great Britain Application No. 1215264.1 dated Dec. 5, 2012.

Great Britain Search Report in corresponding Great Britain Application No. 1215276.5 dated Dec. 21, 2012.

International Search Report in related International Application No. PCT/EP2012/067999, mailed Aug. 9, 2013.

Written Opinion in related International Application No. PCT/EP2012/067999, mailed Aug. 9, 2013.

Danish First Technical Examination mailed Jun. 10, 2013 with Search Report in related Application No. PA 2012 70507 (WO 01/16621 cited in this SR was previously provided to the USPTO in a prior IDS).

US Office Action mailed Aug. 26, 2013, in related U.S. Appl. No. 13/677,713.

Danish First Technical Examination mailed Jun. 4, 2013 with Search Report in related Application No. PA 2012 70503.

(56) References Cited

OTHER PUBLICATIONS

US Office Action mailed May 29, 2013, in related U.S. Appl. No. 13/415,216.
US Office Action mailed on Apr. 8, 2013, in related U.S. Appl. No. 13/677,661.
US Office Action mailed on Mar. 25, 2013, in related U.S. Appl. No. 13/677,713.
US Office Action mailed on May 9, 2013, in related U.S. Appl. No. 13/687,028.
US Office Action mailed on Mar. 7, 2013, in related U.S. Appl. No. 13/687,059.
US Office Action mailed Sep. 30, 2013, in related U.S. Appl. No. 13/687,028.
Danish Search Opinion dated Oct. 10, 2014, in related Danish Patent Application No. PA 2014 70385.
Danish Search Report dated Oct. 10, 2014, in related Danish Patent Application No. PA 2014 70385.
Second Technical Examination in related Danish Patent Application No. PA 2014 70385, dated Jun. 29, 2015.
Notification of First Office Action in corresponding chinese Application No. 201605170185200 dated May 20, 2016.

* cited by examiner

METHOD AND DEVICE FOR DETERMINING A DRIVING SIGNAL FOR VIBROSEIS MARINE SOURCES

BACKGROUND

Technical Field

Embodiments of the subject matter disclosed herein generally relate to methods and systems and, more particularly, to mechanisms and techniques for generating a driving signal for vibroseis marine sources.

Discussion of the Background

Reflection seismology is a method of geophysical exploration to determine the properties of a portion of a subsurface layer in the earth, which is information especially helpful in the oil and gas industry. Marine reflection seismology is based on the use of a controlled source that sends energy waves into the earth. By measuring the time it takes for the reflections to come back to plural receivers, it is possible to estimate the depth and/or composition of the features causing such reflections. These features may be associated with subterranean hydrocarbon deposits.

For marine applications, sources are essentially impulsive (e.g., compressed air is suddenly allowed to expand). One of the most used sources is airguns. An airgun produces a high amount of acoustics energy over a short time. Such a source is towed by a vessel either at the water surface or at a certain depth. The acoustic waves from the airgun propagate in all directions. A typical frequency range of the emitted acoustic waves is between 6 and 300 Hz. However, the frequency content of impulsive sources is not fully controllable, and different sources are selected depending on the needs of a particular survey. In addition, the use of impulsive sources can pose certain safety and environmental concerns.

Thus, another class of sources that may be used is vibratory sources. Vibratory sources, including hydraulically powered sources and sources employing piezoelectric or magnetostrictive material, have been used in marine operations. However, there is no large-scale use of such sources because they have limited power and are not reliable due to the number of moving parts required to generate the seismic waves. A few examples of such sources are now discussed.

A marine vibrator generates a long tone with a varying frequency, i.e., a frequency sweep. This signal is applied to a moving part, e.g., a piston, which generates a corresponding seismic wave. Instantaneous pressure resulting from the movement of plural pistons corresponding to plural marine vibrators may be lower than that of an airgun array, but total acoustic energy transmitted by the marine vibrator may be similar to the energy of the airgun array due to the extended duration of the signal. However, such sources need a frequency sweep to achieve the required energy. Designing such a frequency sweep is now discussed.

U.S. Patent Application Publication No. 20100118647A1, entitled, "Method for optimizing energy output from a seismic vibrator array," the entire disclosure of which is incorporated herein by reference, discloses two flextensional vibrators (low frequency and high frequency) activated by electro-mechanical actuators and emitting seismic energy at two different depths during a frequency sweep. The vibrators are driven by swept frequency signals, each having a different selected frequency response. Signals such as Maximum Length Sequence (MLS) or Gold Sequence (GS) are also used to drive the vibrators. However, the driving signal of this document does not take into account various physical constraints of the seismic vibrator or the medium in which the vibrator operates.

A non-linear frequency sweep is described in U.S. Pat. No. 6,942,059B2, entitled, "Composite bandwidth marine vibroseis array," the entire content of which is incorporated herein by reference. This document discloses a method for seismic marine survey using vibrator sources, each of them placed at different depths. The vibrator sources show a level of seismic energy comparable to an airgun array (single depth) by dividing the seismic bandwidth over a plurality of different bandwidths. Each bandwidth is generated by a vibrator array using a non-linear sweep in order to maximize the output energy. However, this document does not consider the various physical constraints of the marine vibroseis array when determining the frequency sweep.

A sweep design method for a seismic land vibrator is also disclosed in U.S. Pat. No. 7,327,633, entitled, "Systems and methods for enhancing low-frequency content in vibroseis acquisition," the entire content of which is incorporated herein. The patent discloses a method for optimizing sweep signal strength by taking into account a single physical property of a seismic land vibrator, i.e., a stroke limit of the seismic vibrator device. A non-linear sweep is obtained in order to build up the sweep spectral density to achieve a targeted spectrum in the low frequency range. However, other physical properties of the seismic land vibrator, which limit the operation of the land vibrator, are not considered. Further, this patent is directed to a land vibrator, which is different from a marine vibrator.

A more sophisticated sweep design method is disclosed in U.S. patent application Ser. No. 12/576,804, entitled, "System and method for determining a frequency sweep for seismic analysis," the entire content of which is incorporated herein by reference. This method takes into account not only the plate stroke limit but also other constraints of the land vibrator, e.g., the pump flow limit and the servo valve flow limit. However, this method addresses a land vibrator, which has different characteristics than a marine vibrator, and the method also does not take into consideration specific features of the water environment.

Thus, there is a need to provide a method for designing a driving signal that takes into account constraints of the marine vibrator and, optionally, constraints imposed by the water environment.

SUMMARY

According to one exemplary embodiment, there is a method for determining a driving signal of a vibro-acoustic source element that is configured to generate acoustic waves in water. The method includes a step of estimating at least one physical constraint of the vibro-acoustic source element; a step of modeling a ghost function determined by a surface of the water; a step of setting a target energy spectrum density to be emitted by the vibro-acoustic source element during the driving signal; and a step of determining the driving signal in a controller based on the at least one physical constraint, the ghost function, and the target energy spectrum density.

According to still another exemplary embodiment, there is a controller configured to determine a driving signal of a vibro-acoustic source element that is configured to generate acoustic waves in water. The controller includes a processor configured to, estimate at least one physical constraint of the vibro-acoustic source element; receive a ghost function determined by a surface of the water; receive a target energy spectrum density to be emitted by the vibro-acoustic source element during the driving signal; and calculate the driving signal based on the at least one physical constraint, the ghost function, and the target energy spectrum density.

According to still another exemplary embodiment, there is a seismic survey system that includes at least one vibro-acoustic source element configured to generate acoustic waves by moving a piston with an electro-magnetic actuator; a driving mechanism connected to the electro-magnetic actuator and configured to drive the electro-magnetic actuator to generate the acoustic waves; and a controller configured to generate a driving signal for the driving mechanism for generating acoustic waves in water. The controller is configured to estimate at least one physical constraint of the vibro-acoustic source element; receive a ghost function determined by a surface of the water; receive a target energy spectrum density to be emitted by the vibro-acoustic source element during the driving signal; and calculate the driving signal based on the at least one physical constraint, the ghost function, and the target energy spectrum density.

According to yet another exemplary embodiment, there is a computer readable medium including computer executable instructions, wherein the instructions, when executed, implement the above-noted method.

According to still another exemplary embodiment, there is a method for determining a driving signal of a vibro-acoustic source element that is configured to generate acoustic waves in water. The method includes a step of estimating at least one physical constraint of the vibro-acoustic source element; a step of setting a target energy spectrum density to be emitted by the vibro-acoustic source element during the driving signal; and a step of determining the driving signal in a controller based on the at least one physical constraint, and the target energy spectrum density.

According to a further exemplary embodiment, there is a seismic survey system that includes at least one vibro-acoustic source element configured to generate acoustic waves by moving a piston with an actuator; a driving mechanism connected to the actuator and configured to drive the actuator to generate the acoustic waves; and a controller configured to generate a driving signal for the driving mechanism for generating the acoustic waves in water. The controller is configured to estimate at least one physical constraint of the vibro-acoustic source element; receive a target energy spectrum density to be emitted by the vibro-acoustic source element during the driving signal; and calculate the driving signal based on the at least one physical constraint, and the target energy spectrum density.

BRIEF DESCRIPTION OF THE DRAWINGS

The accompanying drawings, which are incorporated in and constitute a part of the specification, illustrate one or more embodiments and, together with the description, explain these embodiments. In the drawings.

DETAILED DESCRIPTION

The following description of the exemplary embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to a method to generate or design a driving signal for a vibro-acoustic source element and/or a marine source array for achieving a desired target output spectrum in compliance with various constraints of each vibro-acoustic source element and other constraints such as environmental constraints introduced by the marine seismic acquisition. However, the embodiments to be discussed next are not limited to a marine seismic source, but may be applied to other structures that generate a seismic wave having a controlled frequency range.

Reference throughout the specification to "one embodiment" or "an embodiment" means that a particular feature, structure, or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures, or characteristics may be combined in any suitable manner in one or more embodiments.

According to an exemplary embodiment, there is a method for determining a driving signal, for a vibro-acoustic source element or a marine source array, which takes into account various constraints of the source. For example, if the vibro-acoustic source element has an electro-magnetic actuator that is driven by a driving mechanism that includes an amplifier, the method identifies physical properties of both the actuator and the amplifier that may limit the ability of the vibro-acoustic source element to provide the expected output, such as the source element stroke limit (e.g., actuator stroke limit), the source element velocity limit, the amplifier current limit, and the amplifier voltage limit. Identification of an additional environmental constraint introduced by the sea surface reflector, known as the "ghost function," is also taken into account by this novel method. The method determines a driving signal that may be modulated both in frequency and amplitude. The driving signal is configured to achieve a target output spectrum with maximum energy output while complying with multiple constraints. Various target output spectrums may be considered. However, for simplicity, the following embodiments discuss a flat target output spectrum.

It is noted that the method discussed below considers a vibro-acoustic source element that is driven by a driving mechanism. However, the method may be applied to other vibratory sources.

Figure 1:
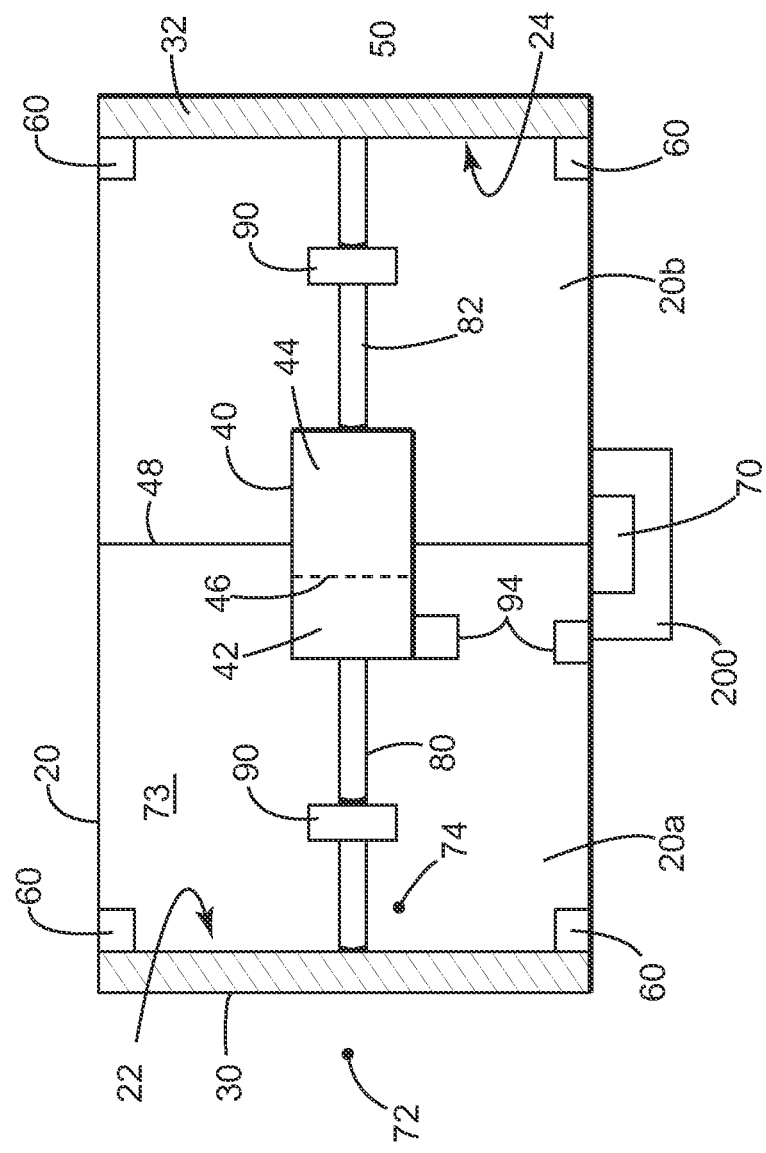
FIG. 1 is a schematic diagram of a vibro-acoustic source element.

Prior to discussing the above-noted method, an exemplary vibro-acoustic source element is now discussed with reference to FIG. 1. According to an exemplary embodiment, the vibro-acoustic source element 10 of FIG. 1 is part of a seismic source array. The vibro-acoustic source element 10 includes an enclosure 20 that together with pistons 30 and 32 enclose an electro-magnetic actuator system 40 and separate it from the ambient 50, which might be water. The enclosure 20 has first and second openings 22 and 24 that are configured to be closed by the pistons 30 and 32. The electro-magnetic actuator system 40 is configured to simultaneously drive the pistons 30 and 32 in opposite directions for generating the seismic waves. In one application, the pistons 30 and 32 are rigid. The electro-magnetic actuator system 40 may include two or more individual electro-magnetic actuators 42 and 44. Irrespective of how many individual electro-magnetic actuators are used in the vibro-acoustic source element 10, the actuators may be provided in pairs, and the pairs are configured to act simultaneously in opposite directions on corresponding pistons in order to prevent a "rocking" motion of the vibro-acoustic source element 10. However, the method also applies to a vibro-acoustic source element that has only one actuator and one piston.

The size and configuration of the electro-magnetic actuators depend on the acoustic output of the vibro-acoustic source element. FIG. 1 shows that the two actuators 42 and 44 are separated by a wall 46, which does not have to be at the middle of the actuator system 40. Further, in one embodiment, the two actuators 42 and 44 are formed as a single unit, and there is no interface between the two actuators. In yet another application, the actuator system 40 is attached to the enclosure 20 by an attachment 48. The attachment 48 may be a strut-type structure. In one application, the attachment 48 may be a wall that splits the enclosure 20 in a first chamber 20a and a second chamber 20b. If the attachment 48 is a wall, the actuators 42 and 44 may be attached to the wall 48 or may be attached to the enclosure 20 by other means in such a way that the actuators 42 and 44 do not contact the wall 48.

To provide the pistons 30 and 32 with the ability to move relative to the enclosure 20 in order to generate the seismic waves, a sealing mechanism 60 is provided between the pistons and the enclosure. The sealing mechanism 60 may be configured to slide back and forth with the pistons. The sealing mechanism 60 may be made of an elastomeric material, or may be a metallic flexible structure. In another application, the sealing mechanism 60 may be a gas or liquid seal. A gas seal (air bearing seal) is configured to inject a gas at the interface between the enclosure and the pistons to prevent the ambient water from entering the enclosure. A liquid seal may use, e.g., a ferromagnetic fluid at the interface between the enclosure and the pistons to prevent the ambient water from entering the enclosure. Other seals may be used as will be recognized by those skilled in the art.

The embodiment shown in FIG. 1 may also include a pressure regulation mechanism 70 (e.g., a pneumatic regulation mechanism if air is used). The pressure regulation mechanism 70 may be used to balance the external pressure of the ambient 50 with a pressure of the medium enclosed by the enclosure 20 to reduce the workload of the actuator system 40. It is noted that if pressure of the ambient at point 72 (in front of the piston 30) is substantially equal to pressure of the enclosed medium 73 of the enclosure 20 at point 74, the workload of the actuator system 40 may be used entirely to activate the piston to generate the acoustic wave instead of a portion thereof used to overcome the ambient pressure at point 72. The enclosed medium 73 of the enclosure 20 may be air or other gases or mixtures of gases.

The pressure regulation mechanism 70 may be fluidly connected to a pressure source (not shown) on the vessel towing the vibro-acoustic source element 10. The pressure regulation mechanism 70 may also be configured to provide an additional force on the pistons 30 and 32, e.g., at lower frequencies, to increase an acoustic output of the vibro-acoustic source element and also to extend a frequency spectrum of the vibro-acoustic source element.

The embodiment illustrated in FIG. 1 may use a single shaft 80 and 82 per piston to transmit the actuation motion from the actuator system 40 to the pistons 30 and 32. However, more than one shaft per piston may be used, depending on the requirements of the vibro-acoustic source element. To provide a smooth motion of the shaft 80 relative to the enclosure 20 (e.g., to prevent a wobbling motion of the shaft), a guiding system 90 may be provided.

In one application, heat is generated by the actuator system 40. This heat may affect the motion of the shafts and/or the functioning of the actuator system 40. For this reason, a cooling system 94 may be provided at the vibro-acoustic source element. The cooling system 94, as will be discussed later, may be configured to transfer heat from the actuator system 40 to the ambient 50.

The pistons 30 and 32 are desired to generate an output having a predetermined frequency spectrum. To control this output, a local control system 200 may be provided, inside, outside, or both, relative to the enclosure 20. The local control system 200 may be configured to act in real-time to correct the output of the vibro-acoustic source element 10. As such, the local control system 200 may include one or more processors that are connected to sensors that monitor the status of the vibro-acoustic source element 10 and provide commands for the actuator system 40 and/or the pressure regulation mechanism 70.

The source arrays discussed above may be made up entirely of the vibro-acoustic source element illustrated in FIG. 1. However, the source arrays may be made up of different vibroseis source elements or a combination of those shown in FIG. 1 and those known in the art. Depending on the vibro-acoustic source element, the method determines different driving signals because the driving signal is dependent on the specific construction and characteristics of the considered vibro-acoustic source element. A driving signal may be a frequency sweep as known in the art, i.e., a signal that includes plural frequencies that are produced one at a time in a certain temporal order. However, the driving signal is not limited to the frequency sweep but may include a non-continuous signal, a signal that includes plural frequencies emitted at the same time, etc.

Figure 2:
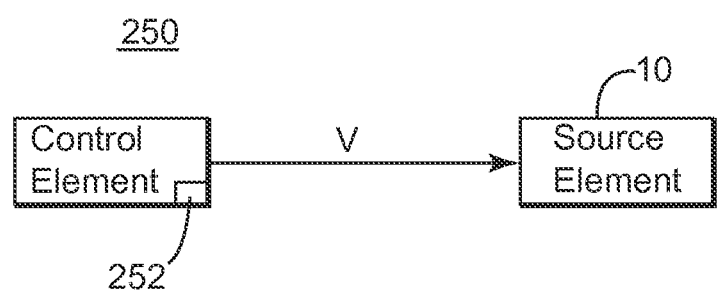
FIG. 2 is a schematic diagram of a driving mechanism for a vibro-acoustic source element.

For a better understanding of the constraints imposed on the vibro-acoustic source element by its associated driving mechanism, FIG. 2 illustrates a generic arrangement for the driving mechanism. Such a driving mechanism 250 is electrically connected to the vibro-acoustic source element 10 and is configured to apply a driving signal to drive the electro-mechanical actuator of the vibro-acoustic source element 10. An exemplary structure of the driving mechanism 250 may include a processor 252 for generating the driving signal. For example, in one application, the processor 252 has a first component that is configured to generate a baseband carrier signal. The baseband carrier signal may have characteristics as known to those skilled in the art. A second component of the processor 252 may act as a pseudo-random number signal generator, and may be configured to generate a signal that is mixed in a third component with the signal of the first component. The mixed signal may be amplified by a fourth component prior to being provided to the vibro-acoustic source element 10. It is noted that the driving mechanism 250 may be part of the vibro-acoustic source element 10 or may be provided outside the vibro-acoustic source element. Also, it is noted that other configurations for the driving mechanism 250 may be used as those skilled in the art would recognize.

Figure 3:
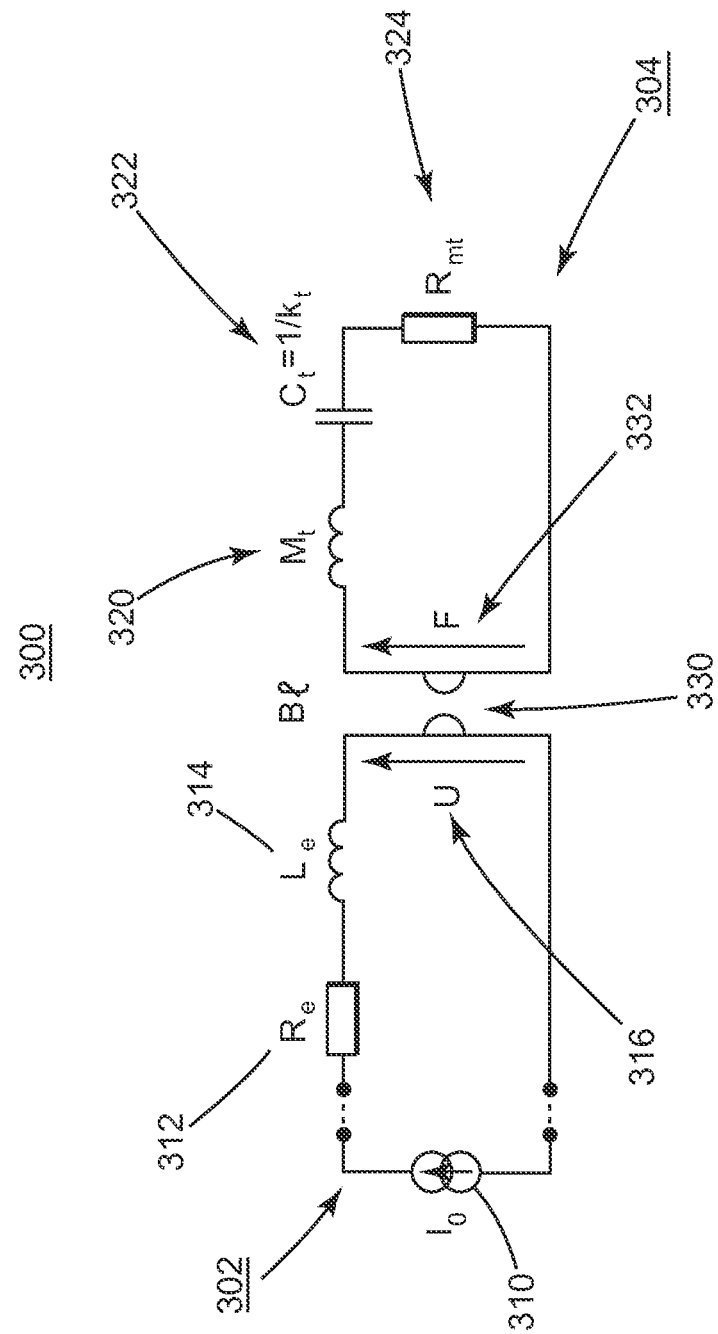
FIG. 3 is an electro-mechanical model for a vibro-acoustic source element according to an exemplary embodiment.

With this structure of the driving mechanism 250 and the structure of the vibro-acoustic source element 10 discussed with regard to FIG. 1, a schematic representation of some characteristics of the driving mechanism and the vibro-acoustic source element are shown in FIG. 3. Again, it is noted that other vibro-acoustic source elements or other driving mechanisms may be used. FIG. 3 illustrates a lumped element model for the electrical and mechanical components of the vibro-acoustic source element 10 and also for the electrical components of a component of the driving mechanism 250 that acts as an electrical amplifier. More specifically, the model 300 shown in FIG. 3 has an electrical part 302 that corresponds to the electro-magnetic actuator and the driving mechanism of the vibro-acoustic source element, and a mechanical part 304 that corresponds to the piston of the vibro-acoustic source element.

The electrical part 302 includes a current source 310 represented by $I_0$, a coil resistance 312 represented by $R_e$, and a coil inductance 314 represented by $L_e$, where the coil is part of the electro-magnetic actuator discussed above with regard to FIG. 1. An induced electromotive voltage 316 represented by U appears into the coil, and this voltage is responsible for actuating the piston of the electro-magnetic actuator. The mechanical part 304 includes the piston mass and acoustic reactance 320 represented by $M_t$, a total mechanical stiffness 322 represented by $C_t$, and a mechanical damping and acoustic radiation 324 represented by $R_{mt}$. Through a coupling 330 between the electrical part 302 and the mechanical part 304, a Lorentz force 332 produced by the electrical part is transmitted to the mechanical part, where the Lorentz force is proportional to the current of the current source 310.

With this model for the vibro-acoustic source element, it is now possible to determine the influence of various physical constraints on the seismic output. A good quantity for estimating the seismic output of the vibro-acoustic source element is the acceleration of the piston. The acceleration of the piston (and also a far field sound pressure that is related to the acceleration, as will be discussed later) is limited for the representation considered in FIG. 3 by at least four factors. These factors are the maximum displacement of the piston $X_{max}$, the maximum speed of the piston $V_{max}$, the maximum current $I_{max}$ that may be generated by the driving mechanism shown in FIG. 2, and the maximum voltage $U_{max}$ of the same device. The maximum acceleration of the piston is determined, for example, for each of these four factors by equations:

$$a_{max} = -\omega^2 X_{max},$$

$$a_{max} = \omega V_{max},$$

$$a_{max} = j\omega Bl G_m I_{max}, \text{ and}$$

$$a_{max} = \frac{j\omega Bl G_m U_{max}}{Z_{in}}.$$

The quantities $G_m$ and $Z_{in}$ depend on the parameters shown in FIG. 3.

Figure 4:
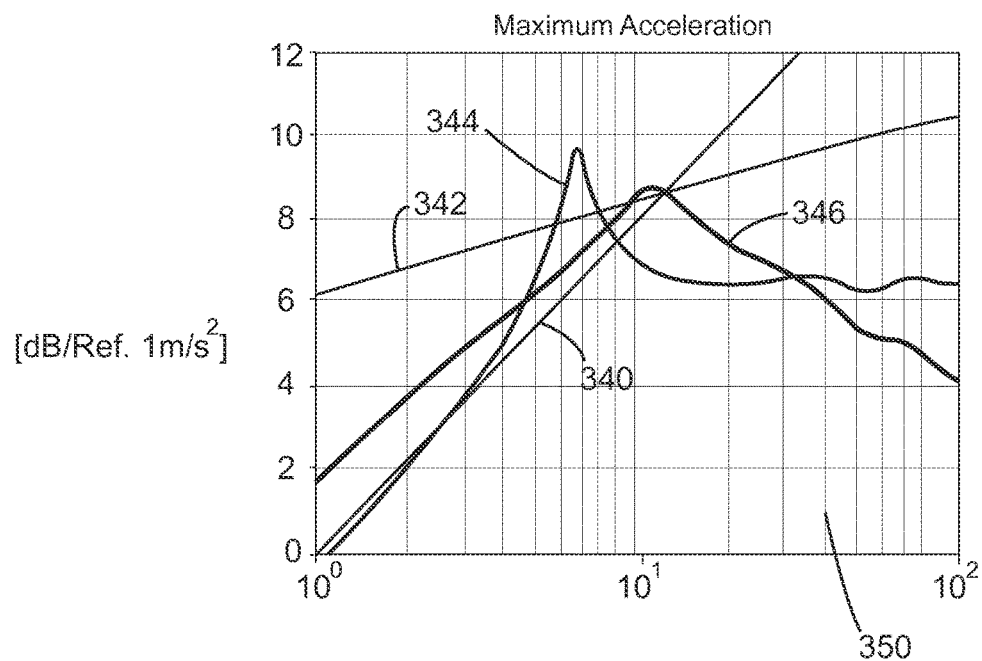
FIG. 4 is a graph showing a maximum acceleration of a vibro-acoustic source element as a function of various parameters according to an exemplary embodiment.

The maximum acceleration $a_{max}$ may be plotted on the same graph, as shown in FIG. 4, for the four factors. Thus, curve 340 corresponds to $X_{max}$, curve 342 corresponds to $V_{max}$, curve 344 corresponds to $I_{max}$ and curve 346 corresponds to $U_{max}$. The intersection of these curves corresponding to the four factors determines an area 350 that is representative of an available operating range of the vibro-acoustic source element. This means that as long as the vibro-acoustic source element operates in the area 350 defined by these factors, a sustainable output of the vibro-acoustic source element is expected.

Figure 5:
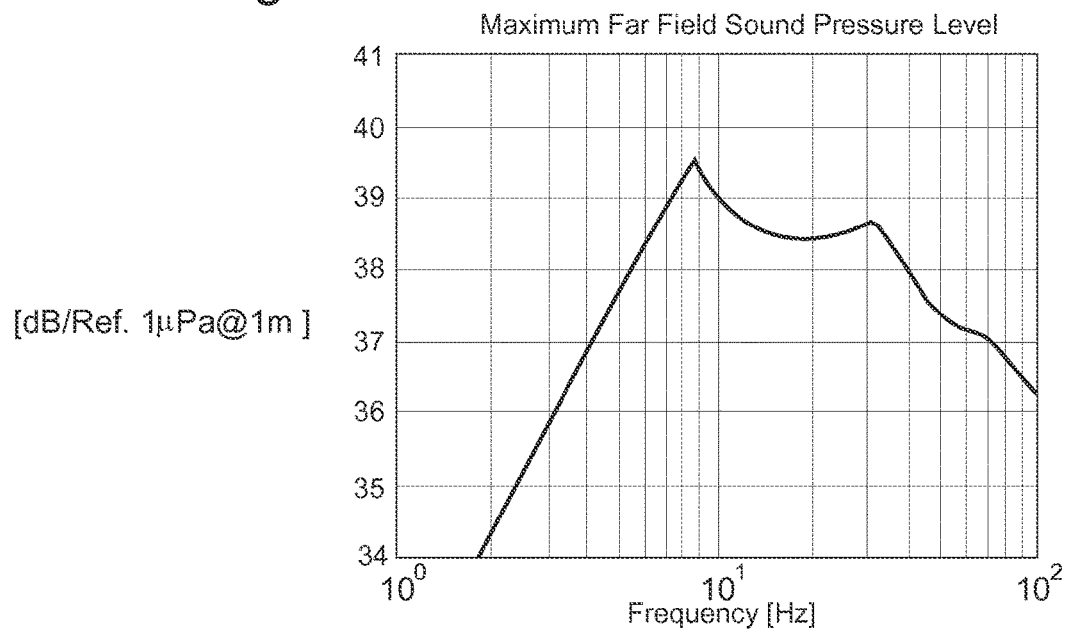
FIG. 5 is a graph illustrating a maximum far field sound pressure level of a vibro-acoustic source element as a function of frequency according to an exemplary embodiment.
Figure 6:
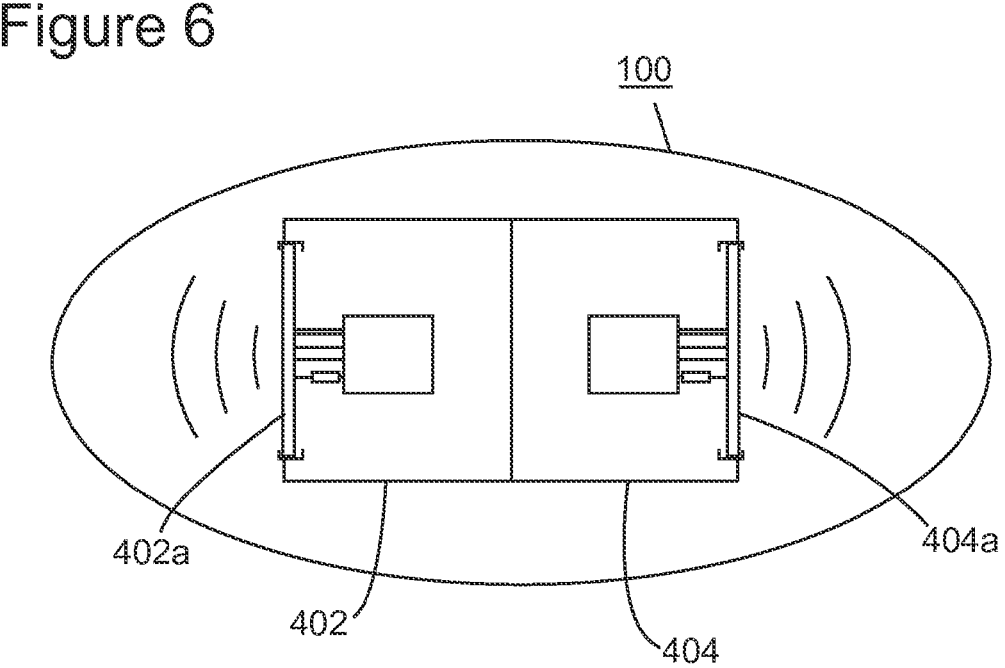
FIG. 6 is a schematic representation of a vibro-acoustic source element according to an exemplary embodiment.

As the maximum acceleration of the piston is related to the maximum sound pressure in a far field in a free-field, the maximum sound pressure has the shape shown in FIG. 5. FIG. 5 illustrates a sound pressure in dB at 1 m from the source with a reference of 1 µPa. It is noted that the values shown on the Y axis in both FIGS. 4 and 5 are scaled. For example, the maximum sound pressure may be related to the maximum acceleration by the relation:

$$p_{max}(r, j\omega) = \frac{\rho}{4\pi r} S a_{max}(j\omega),$$

where ρ is the density of the medium and S is the area of the piston. Regarding the area S, it is noted that for the specific vibro-acoustic source element discussed with regard to FIG. 1, there are two pistons. In this regard, FIG. 6 schematically shows the vibro-acoustic source element 10 having a first projector 402 and a second projector 404, the two projectors arranged back-to-back. Each projector has its own piston 402a and 404a. As the projectors are actuated in phase and are back-to-back, the vibro-acoustic source element 10 acts as a monopole, i.e., a point source. With this clarification, it is noted that area S in the above formula includes the area of two pistons 402a and 404a. Of course, for other configurations, for example, a vibro-acoustic source element with only one projector, or more than two projectors, or another type of vibro-acoustic source element, the area S and the above equation need to be adjusted accordingly.

Up to this point, the physical constraints of the vibro-acoustic source element have been discussed and are specific for the vibro-acoustic source element shown in FIG. 1. For other types of source elements, other constraints may be considered. Based on the teachings of the above embodiments, one skilled in the art would know how to determine the physical constraints for the source at hand. Next, a target shape for an energy spectral density is discussed, still with regard to the vibro-acoustic source element shown in FIG. 1.

For determining the energy that should be provided by the driving signal, the sound pressure level discussed above does not provide enough information. The quantity that provides the missing information is the energy spectral density (ESD). The ESD for a finite energy signal (e.g., a sweep) in dB at 1 m in μPa/Hz is given by:

$$ESD_{dB} = 10\log_{10}\frac{ESD(f)}{(10^{-6})^2},$$

where ESD(f) is the energy spectral density at 1 m from the source in Pa$^2$/Hz and is given by a Fast Fourier Transform of the pressure. From here, using, for example, a Parseval operation, the acoustic energy of the source can be calculated.

Figure 7:
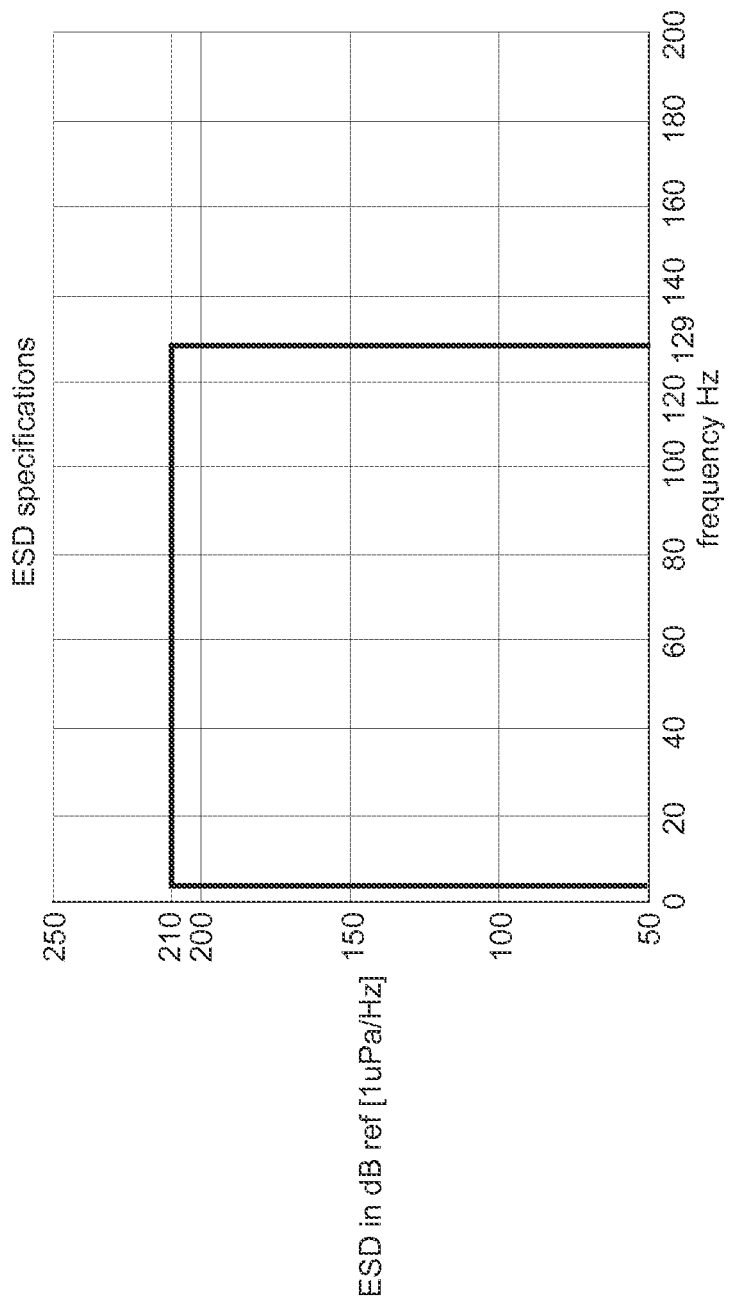
FIG. 7 is a target output energy density spectrum according to an exemplary embodiment.

For the given vibro-acoustic source element, it is desired to determine the driving signal such that a target ESD is obtained. There are various possible shapes for the desired ESD depending on the nature of the survey, the intended features to be revealed, etc. As an example, FIG. 7 shows a flat ESD over 4 to 128 Hz. A flat ESD has the advantage that increases the resolution of the final image for most of the frequencies in the frequency band. Thus, the ESD shown in FIG. 7 is the ESD target shape. However, it is noted that the ESD may have other shapes, for example, a sinus shape or other non-regular shapes.

Another constraint for calculating the driving signal is now discussed in more detail. This constraint, which is due to the environment, is the "ghost function." By taking into account this constraint, a final image of the subsurface to be obtained with this source is better. However, it is noted that the ghost function may be ignored when determining the driving signal for the vibro-acoustic source element. The ghost function may be seen as a weighting function applied to the energy spectrum density. Because a single vibro-acoustic source element or a seismic source array (including plural vibro-acoustic source elements) may be used at a specific depth, certain notches appear in the amplitude spectrum within the seismic frequency range, depending on the depth. These notches are caused by the sea surface reflected waves interfering with direct arrival waves (the constructive and destructive interference of these waves creating the ghost effect). Therefore, the ghost function may be considered when designing the driving signal.

Figure 8A:
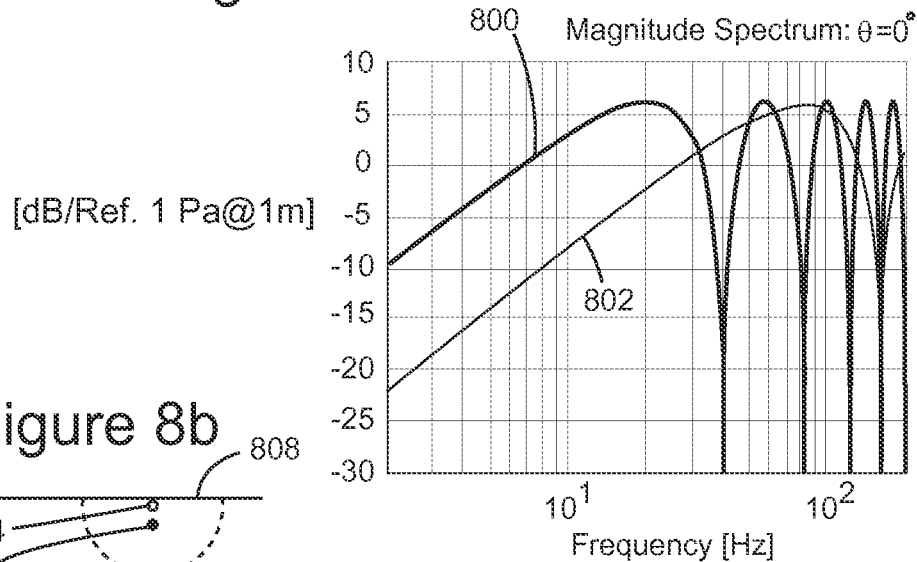
FIGS. 8a and 8b illustrate a vertical ghost function for two different depths.
Figure 8B:
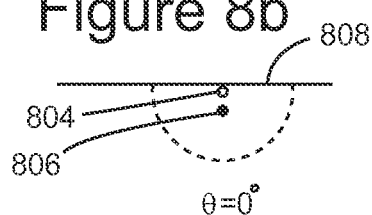
Figure 9A:
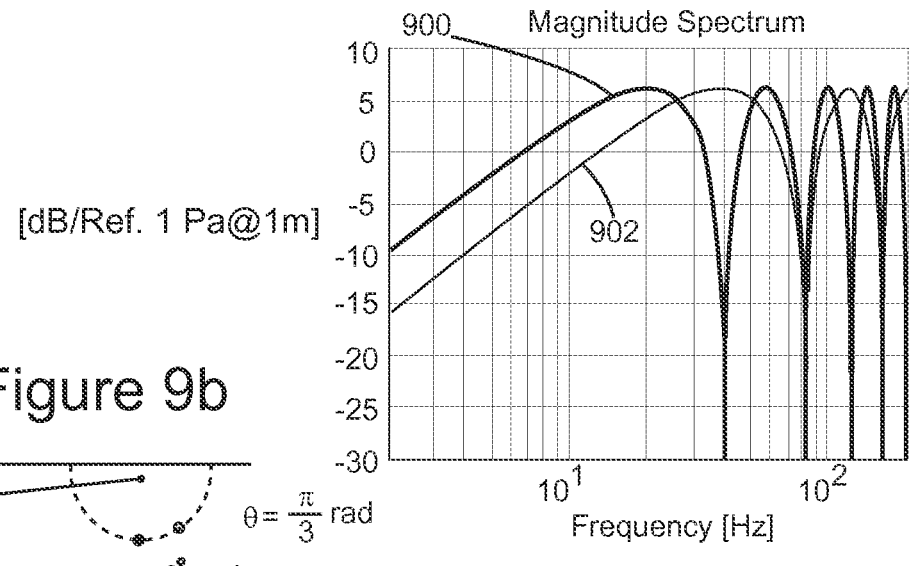
FIGS. 9a and 9b illustrate a ghost function for two different elevation angles.
Figure 9B:

According to an exemplary embodiment, the ghost function may take the form g(d, θ)=2 sin(kd·cos θ), where d is a depth of the vibro-acoustic source element relative to the sea surface, k is wavenumber, and θ is an elevation angle (elevation angle describes the position of an observer relative to a vertical line through the vibro-acoustic source element). An example of the ghost function for two different depths at zero elevation angle is shown in FIG. 8a, with curve 800 illustrating the ghost function for a first depth and curve 802 corresponding to a second depth, smaller than the first depth. FIG. 8b illustrates the two positions 804 and 806 of the sources relative to the sea surface 808 having the elevation angle zero. FIG. 9a shows the dependence of the ghost function with the frequency for various elevation angles for a given depth. Curve 900 illustrates this dependence for a zero elevation angle, and curve 902 illustrates the dependence for a 60° elevation angle. FIG. 9b shows the two elevation angles relative to the source 904.

In both FIGS. 8a and 9a it is noted that the ghost function introduces notches at various frequencies and also boosts the spectrum at other frequencies. Thus, a careful consideration of the ghost function when determining the ESD target helps improve the ESD in the low-frequency range, which is advantageous as the low-frequency range of the spectrum offers a better resolution of the subsurface at deeper levels.

Figure 10:
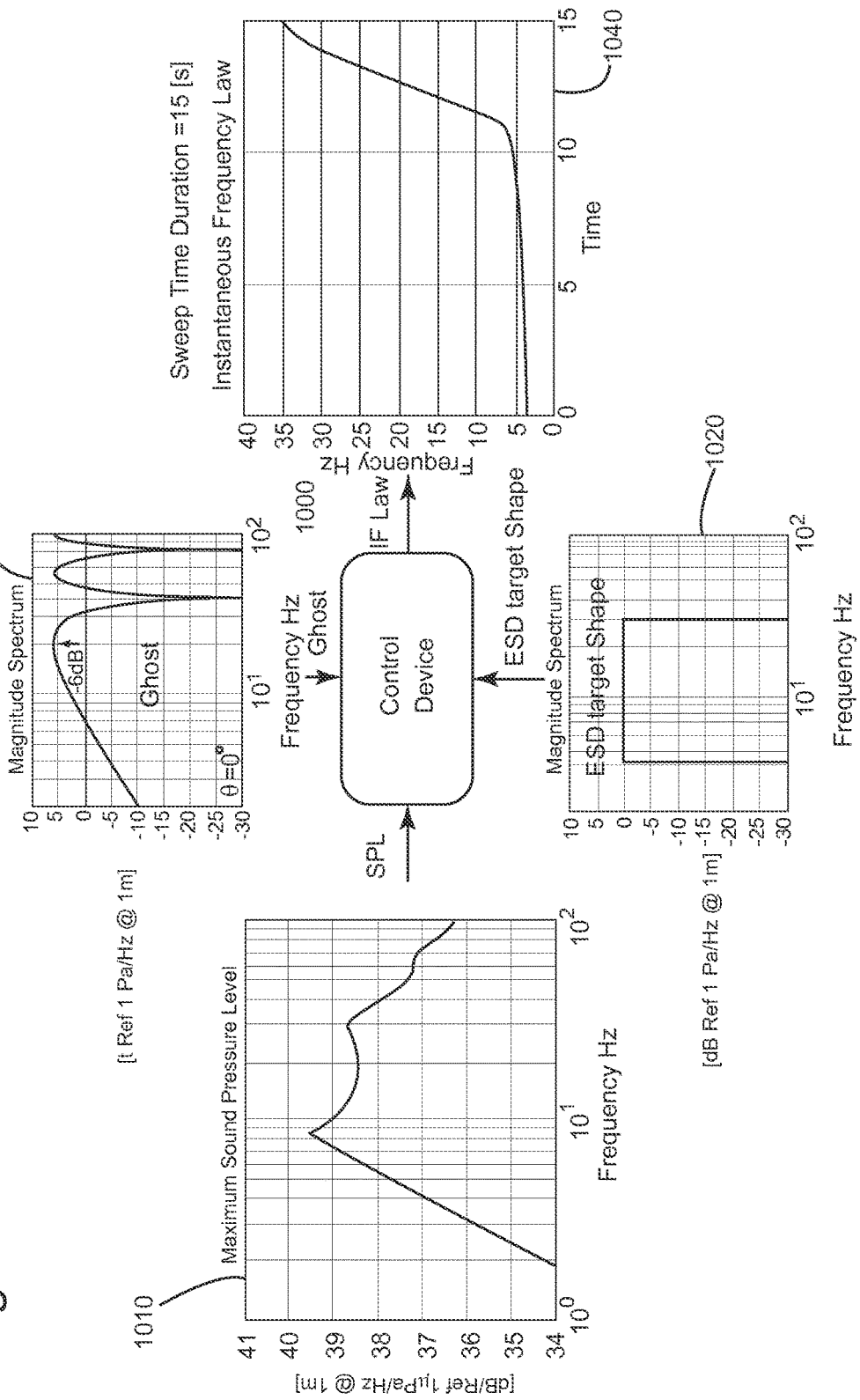
FIG. 10 is a schematic representation of a method for determining a driving signal for a vibro-acoustic source element according to an exemplary embodiment.

Having now all the ingredients necessary for designing the driving signal, i.e., the physical constraints of the vibro-acoustic source element, the target ESD, and, optionally, the ghost function, a frequency-dependent far-field sound pressure P that can be generated without exceeding the vibro-acoustic source element specifications can be determined. Considering this acoustic pressure to be P and the instantaneous frequency to be $f_i(t)$, a maximum far-field sound pressure in free-field can be written as:

$$P(t) = P_{max}(f_i(t)) \cdot \sin(2\pi \int_0^t f_i(t)dt + \phi),$$

where φ is the sweep initial time. The free-field condition assumes that the waves emitted by the vibro-acoustic source element are not reflected at the water-air interface or that there is no water-air interface. Thus, the free-field condition is free of ghosts. The instantaneous frequency can be determined by inverting the instantaneous time as follows:

$$t_i(f) = \int_{f_{min}}^{f_{max}} 4\frac{ESD(f)}{P^2(f)}\,df,$$

where ESD(f) is the desired far-field energy spectrum density in free-field, but taking into account the ghost weighting function, and $f_{min}$ and $f_{max}$ are the sweep minimum and maximum frequencies, respectively. Based on this instantaneous frequency law, the driving signal is generated according to maximum available amplitude that permits the transmission of the far-field signature with maximum energy. The instantaneous frequency law is illustrated in FIG. 10. A control device 1000 (to be discussed later) is configured to take as input the physical constraints 1010 of the vibro-acoustic source element, the ESD target 1020, and, optionally, the ghost function 1030 for outputting the driving signal 1040.

Figure 11:
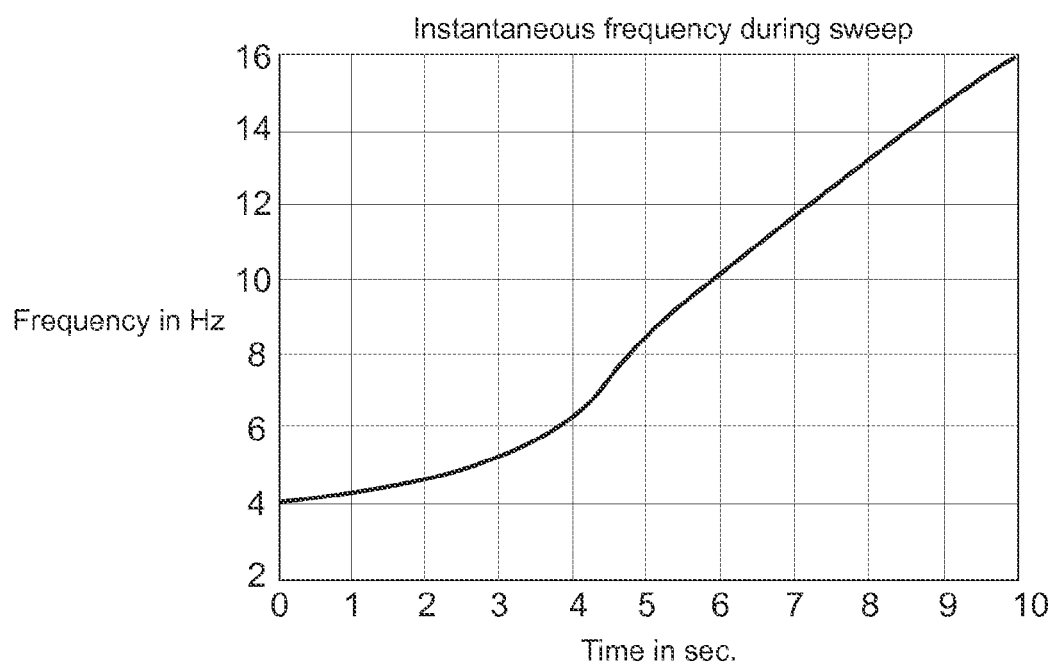
FIG. 11 is a schematic representation of a driving signal according to an exemplary embodiment.

It is noted in FIG. 10 that according to the driving signal 1040, the vibro-acoustic source element spends most of the time (e.g., 10 s of the total 15 s sweep time) producing low frequencies (e.g., lower than 5 Hz). If the ghost function effects 1030 are not taken into account, the driving signal for the specific vibro-acoustic source element used in these calculations is as shown in FIG. 11. In other words, according to an exemplary embodiment, the driving signal shown in FIG. 11 takes into consideration the constraints 1010 on the vibro-acoustic source element and the ESD target shape 1020, but not the ghost function effects 1030. This is an alternative operating mode of the vibro-acoustic source element.

Figure 12:
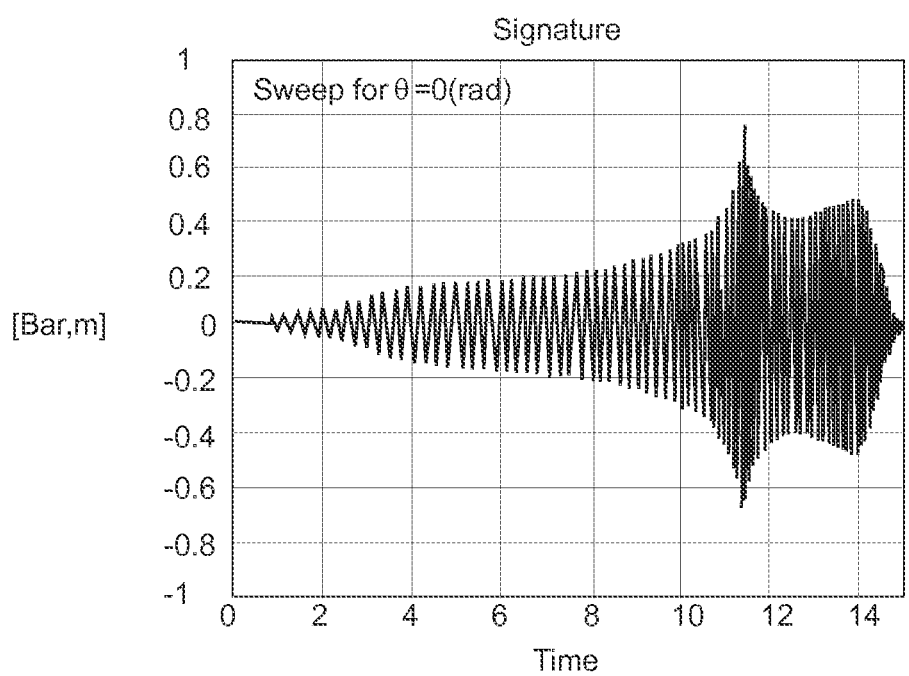
FIG. 12 is a schematic representation of a free far field sound pressure generated by a vibro-acoustic source element according to an exemplary embodiment.
Figure 13:
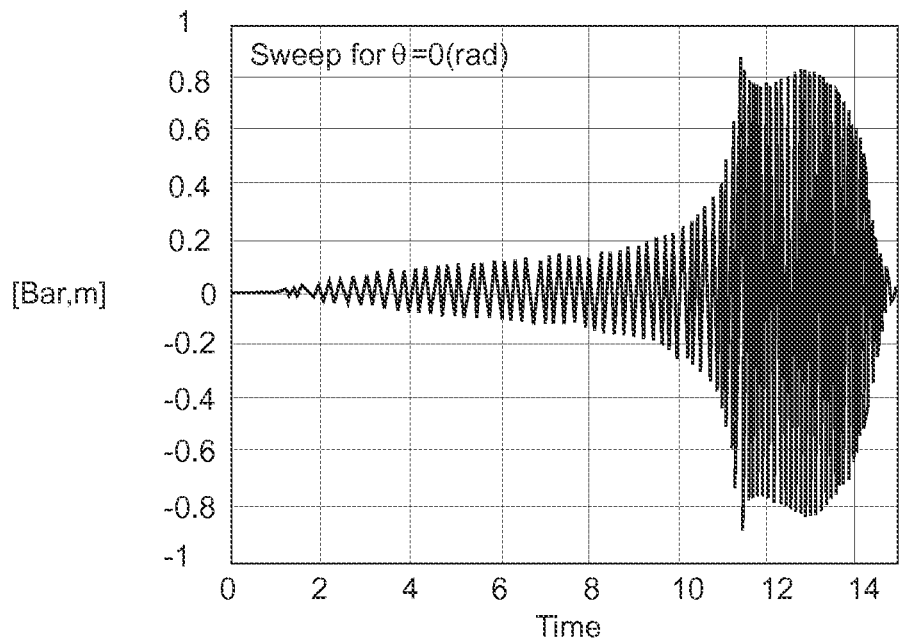
FIG. 13 is a schematic representation of a far field sound pressure generated by a vibro-acoustic source element and a corresponding ghost according to an exemplary embodiment.

To better understand the difference between the driving signal without the ghost function, i.e., the free-field, and the driving signal with the ghost function, FIG. 12 shows the far-field sound pressure signature at 1 m for the free-field and FIG. 13 shows the far-field sound pressure signature at 1 m for the case with ghost.

It is noted that the above discussion about the driving signal is valid for both a vibro-acoustic source element and an array of vibro-acoustic source elements, i.e., a marine source array. If a marine source array is considered, then the arrangement of the vibro-acoustic source elements needs to be considered, and a driving signal for the whole source array may be determined as noted above. However, because of the different distances between the vibro-acoustic source elements of the marine source array, various time delays may be calculated and applied to the elements making up the marine source array.

Figure 14:
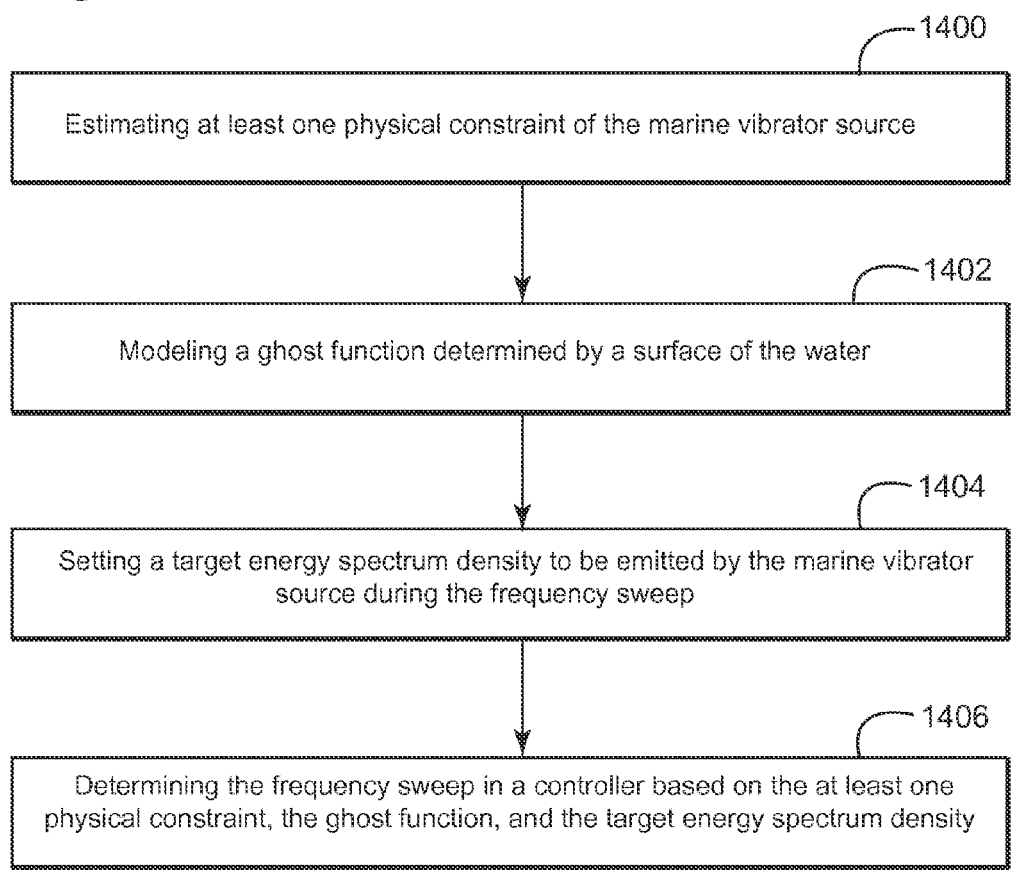
FIG. 14 is a flow chart of a method for generating a driving signal for a vibro-acoustic source element according to an exemplary embodiment.

According to an exemplary embodiment illustrated in FIG. 14, there is a method for determining the driving signal of a vibro-acoustic source element that is configured to generate acoustic waves in water. The method includes a step 1400 of estimating at least one physical constraint 1010 of the vibro-acoustic source element; a step 1402 of modeling a ghost function 1030 determined by a surface of the water; a step 1404 of setting a target energy spectrum density 1020 to be emitted by the vibro-acoustic source element during the driving signal; and a step 1406 of determining the driving signal 1040 in a controller 1000 based on at least one physical constraint 1010, the ghost function 1030, and the target energy spectrum density 1020.

Figure 15:
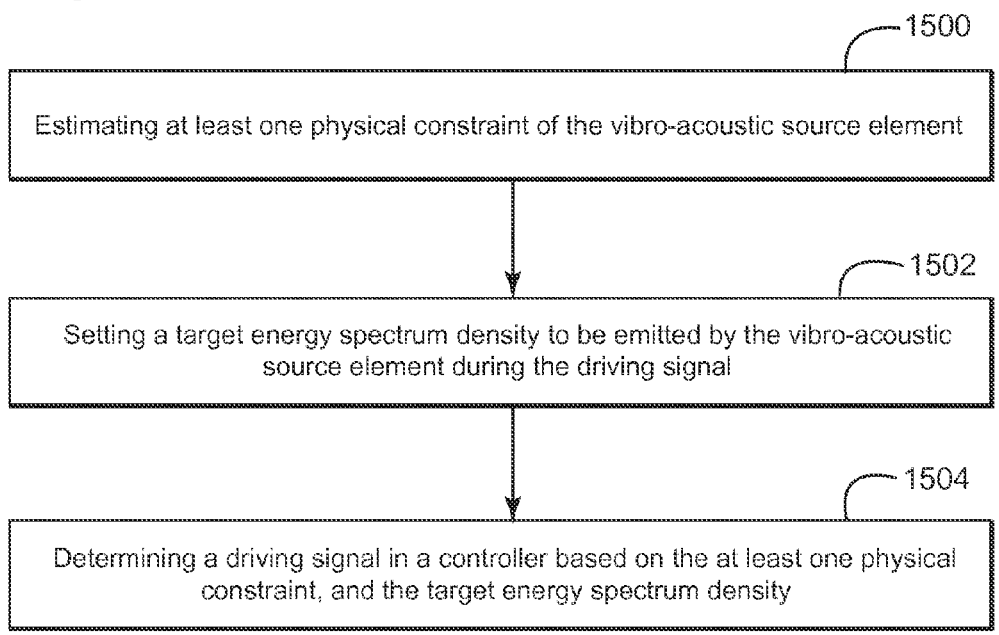
FIG. 15 is a flow chart of another method for generating a driving signal for a vibro-acoustic source element according to an exemplary embodiment.

According to another exemplary embodiment illustrated in FIG. 15, there is another method for determining the driving signal of a vibro-acoustic source element that is configured to generate acoustic waves in water. The method includes a step 1500 of estimating at least one physical constraint 1010 of the vibro-acoustic source element; a step 1502 of setting a target energy spectrum density 1020 to be emitted by the vibro-acoustic source element during the driving signal; and a step 1504 of determining the driving signal 1040 in a controller 1000 based on at least one physical constraint 1010, and the target energy spectrum density 1020.

According to one or more of the exemplary embodiments discussed above, the instantaneous frequency law is matched according to the targeted energy spectrum density based on physical limits of the vibro-acoustic source element and its depth. Further, regarding the constraint of the ghost function, tuning can be obtained for the on-axis far-field signature but also for any off-axis response (e.g., helpful for phased array application). Furthermore, the process described above permits sufficient spectral energy density in the low-frequency-end band. It is known that the low frequency may permit evaluation of the earth's subsurface at deeper levels.

Figure 16:
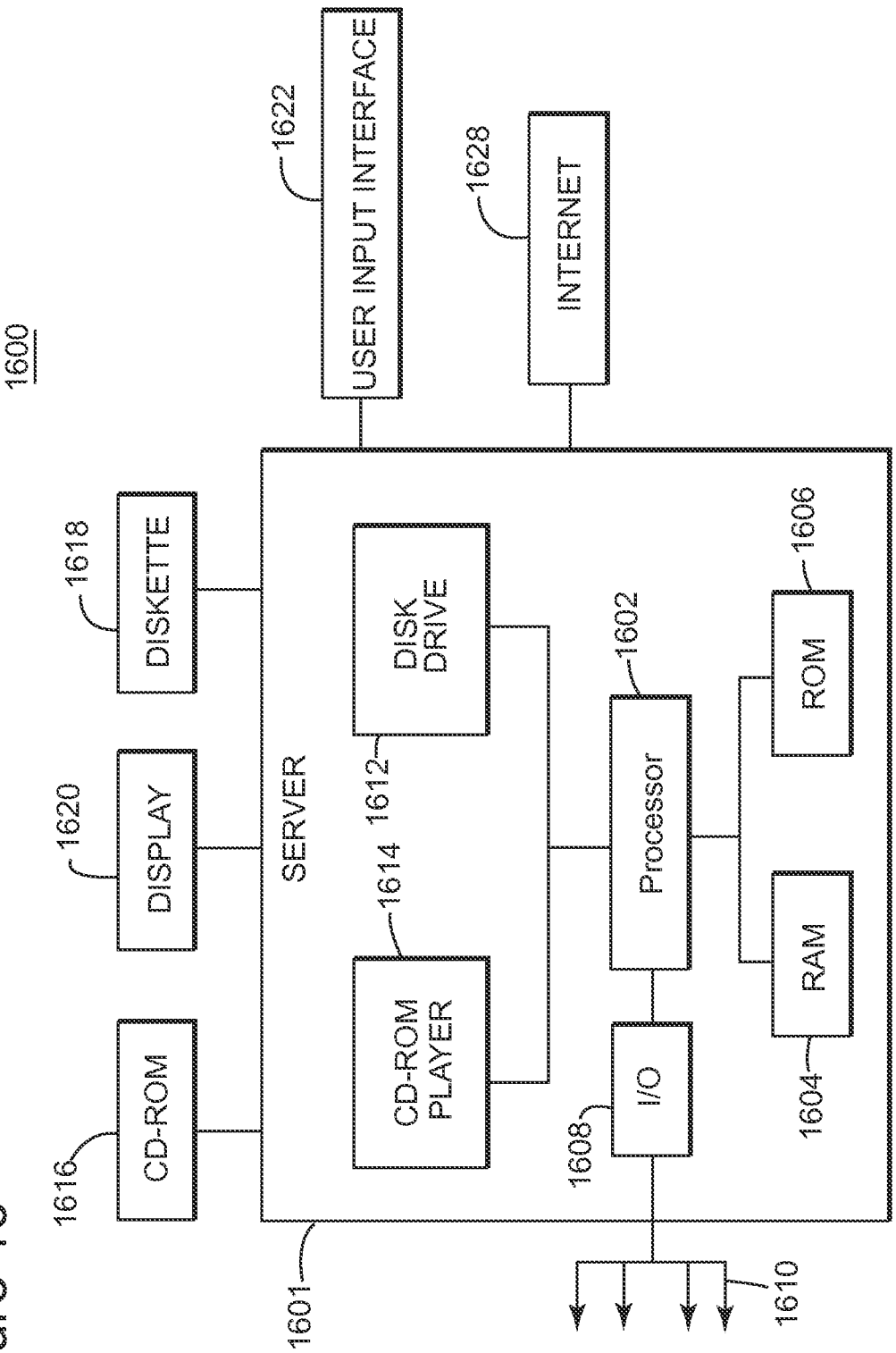
FIG. 16 is a schematic diagram of a controller according to an exemplary embodiment.

An example of a representative control system capable of carrying out operations in accordance with the exemplary embodiments discussed above is illustrated in FIG. 16. Hardware, firmware, software or a combination thereof may be used to perform the various steps and operations described herein.

The exemplary control system 1600 suitable for performing the activities described in the exemplary embodiments may include server 1601. Such a server 1601 may include a central processor unit (CPU) 1602 coupled to a random access memory (RAM) 1604 and to a read-only memory (ROM) 1606. The ROM 1606 may also be other types of storage media to store programs, such as programmable ROM (PROM), erasable PROM (EPROM), etc. The processor 1602 may communicate with other internal and external components through input/output (I/O) circuitry 1608 and bussing 1610, to provide control signals and the like. For example, the processor 1602 may communicate with the sensors, electro-magnetic actuator system, and/or the pneumatic mechanism. The processor 1602 carries out a variety of functions as is known in the art, as dictated by software and/or firmware instructions.

The server 1601 may also include one or more data storage devices, including hard and floppy disk drives 1612, CD-ROM drives 1614, and other hardware capable of reading and/or storing information such as a DVD, etc. In one embodiment, software for carrying out the above discussed steps may be stored and distributed on a CD-ROM 1616, diskette 1618, or other form of media capable of portably storing information. These storage media may be inserted into, and read by, devices such as the CD-ROM drive 1614, the disk drive 1612, etc. The server 1601 may be coupled to a display 1620, which may be any type of known display or presentation screen, such as LCD displays, plasma displays, cathode ray tubes (CRTs), etc. A user input interface 1622 is provided, including one or more user interface mechanisms such as a mouse, keyboard, microphone, touch pad, touch screen, voice-recognition system, etc.

The server 1601 may be coupled to other computing devices, such as the equipment of a vessel, via a network. The server may be part of a larger network configuration as in a global area network (GAN) such as the Internet 1628, which allows ultimate connection to the various landline and/or mobile client/watcher devices.

As also will be appreciated by one skilled in the art, the exemplary embodiments may be embodied in a wireless communication device, a telecommunication network, as a method or in a computer program product. Accordingly, the exemplary embodiments may take the form of an entirely hardware embodiment or an embodiment combining hardware and software aspects. Further, the exemplary embodiments may take the form of a computer program product stored on a computer-readable storage medium having computer-readable instructions embodied in the medium. Any suitable computer-readable medium may be utilized, including hard disks, CD-ROMs, digital versatile discs (DVDs), optical storage devices, or magnetic storage devices such a floppy disk or magnetic tape. Other non-limiting examples of computer-readable media include flash-type memories or other known types of memories.

The disclosed exemplary embodiments provide a source array, computer software, and a method for generating a driving signal for marine vibrational sources. It should be understood that this description is not intended to limit the invention. On the contrary, the exemplary embodiments are intended to cover alternatives, modifications, and equivalents, which are included in the spirit and scope of the invention as defined by the appended claims. Further, in the detailed description of the exemplary embodiments, numerous specific details are set forth to provide a comprehensive understanding of the claimed invention. However, one skilled in the art would understand that various embodiments may be practiced without such specific details.

Although the features and elements of the present exemplary embodiments are described in the embodiments in particular combinations, each feature or element can be used alone, without the other features and elements of the embodiments, or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A method for determining a driving signal of a vibro-acoustic source element that is configured to generate acoustic waves in water, the method comprising:

estimating at least one physical constraint related to operating the vibro-acoustic source element;

modeling a ghost function that represents an effect of a surface of the water;

setting a target energy spectrum density to be emitted by the vibro-acoustic source element during the driving signal; and determining the driving signal in a controller based on the at least one physical constraint, the ghost function, and the target energy spectrum density.

2. The method of claim 1, wherein the vibro-acoustic source element has an electro-magnetic actuator configured to actuate a piston.

3. The method of claim 2, wherein the at least one physical constraint includes a combination of one or more of a maximum displacement of the piston, a maximum speed of the piston, a maximum current of a driving mechanism that drives the electro-magnetic actuator, and a maximum voltage of the driving mechanism.

4. The method of claim 2, wherein the at least one physical constraint includes a maximum displacement of the piston, a maximum speed of the piston, a maximum current of a driving mechanism that drives the electro-magnetic actuator, and a maximum voltage of the driving mechanism.

5. The method of claim 4, further comprising:
determining a domain of operation of the vibro-acoustic source element as an intersection of the maximum displacement, the maximum speed, the maximum current and the maximum voltage curves.

6. The method of claim 1, wherein the ghost function takes into account a reflection of a wave from the surface of the water.

7. The method of claim 1, wherein the target energy spectrum density is flat.

8. The method of claim 1, wherein a majority of time corresponding to the driving signal corresponds to a low frequency range.

9. A controller configured to determine a driving signal of a vibro-acoustic source element that is configured to generate acoustic waves in water, the controller comprising:
a processor configured to,
estimate at least one physical constraint related to operating the vibro-acoustic source element;
receive a ghost function modeled to represent an effect of a surface of the water;
receive a target energy spectrum density to be emitted by the vibro-acoustic source element during the driving signal; and
calculate the driving signal based on the at least one physical constraint, the ghost function, and the target energy spectrum density.

10. The controller of claim 9, wherein the at least one physical constraint includes a combination of one or more of a maximum displacement of a piston of the vibro-acoustic source element, a maximum speed of the piston, a maximum current of a driving mechanism that drives the electro-magnetic actuator, and a maximum voltage of the driving mechanism.

11. The controller of claim 9, wherein the at least one physical constraint includes a maximum displacement of a piston of the vibro-acoustic source element, a maximum speed of the piston, a maximum current of a driving mechanism that drives the electro-magnetic actuator, and a maximum voltage of the driving mechanism.

12. The controller of claim 11, further comprising:
determining a domain of operation of the vibro-acoustic source element as an intersection of the maximum displacement, the maximum speed, the maximum current and the maximum voltage curves.

13. The controller of claim 9, wherein the ghost function takes into account a reflection of a wave from the surface of the water.

14. The controller of claim 9, wherein the target energy spectrum density is flat.

15. The controller of claim 9, wherein a majority of time corresponding to the driving signal corresponds to a low frequency range.

16. A seismic survey system comprising:
at least one vibro-acoustic source element configured to generate acoustic waves by moving a piston with an electro-magnetic actuator;
a driving mechanism connected to the electro-magnetic actuator and configured to drive the electro-magnetic actuator to generate the acoustic waves; and
a controller configured to generate a driving signal for the driving mechanism for generating acoustic waves in water,
wherein the controller is configured to
estimate at least one physical constraint related to operating the vibro-acoustic source element;
receive a ghost function modeled to represent an effect of a surface of the water;
receive a target energy spectrum density to be emitted by the vibro-acoustic source element during the driving signal; and
calculate the driving signal based on the at least one physical constraint, the ghost function, and the target energy spectrum density.

17. The system of claim 16, wherein the at least one physical constraint includes a combination of one or more of a maximum displacement of a piston of the vibro-acoustic source element, a maximum speed of the piston, a maximum current of a driving mechanism that drives the electro-magnetic actuator, and a maximum voltage of the driving mechanism.

* * * * *